United States Patent [19]
Saltsman et al.

[11] Patent Number: 5,992,583
[45] Date of Patent: Nov. 30, 1999

[54] METHOD OF STABILIZING VALVE LIFT-OFF IN HYDRAULIC SHOCK ABSORBERS

[75] Inventors: Benjamin J Saltsman, Ferndale; Colin Jeffrey Young, Dearborn; Michael James Lynch; William M. Stewart, both of Livonia, all of Mich.

[73] Assignee: Ford Global Technologies, Inc., Dearborn, Mich.

[21] Appl. No.: 09/049,347

[22] Filed: Mar. 27, 1998

[51] Int. Cl.[6] ........................................................ F16F 9/06
[52] U.S. Cl. .................... 188/269; 188/282.8; 188/322.5
[58] Field of Search .................. 188/267.1, 269, 188/280, 282.1, 282.5–282.8, 317, 322.15, 322.22, 322.5

[56] References Cited

U.S. PATENT DOCUMENTS

| | | | |
|---|---|---|---|
| 4,452,437 | 6/1984 | Lochner | 267/64.22 |
| 4,610,332 | 9/1986 | Mourray | 188/322.15 |
| 4,726,453 | 2/1988 | Obstfelder et al. | 188/319 |
| 5,645,752 | 7/1997 | Weiss et al. | |
| 5,900,184 | 5/1999 | Weiss et al. | 252/62.52 |

*Primary Examiner*—Chris Schwartz
*Attorney, Agent, or Firm*—Joseph W. Malleck

[57] ABSTRACT

Method of stabilizing valve lift-off movement in an automotive hydraulic shock absorber having compression and expansion chambers filled with a hydraulic shock-absorber fluid is diclosed. The chamber are divided by a valve body which has one or more orifices that have fluid flow therethrough controlled by a spring biased valve that lifts off from the valve body when the fluid pressure differential between chambers is above a predetermined amount. The steps of the method comprise (a) stationing the spring biased valve with respect to the orifices so that the fluid forcing the valve to lift off and overcome the spring bias will exit from the orifices in a manner that creates a velocity gradient in the expansion chamber resulting in pressure differences that disturb a smooth lift-off of the valves; and (b) modifying the hydraulic shock absorber fluid to form a mixture containing fumed amorphous silica whereby the fluid mixture will possess a viscosity inversely proportional to the velocity of the fluid mixture regions, the mixture will achieve the needed hydraulic attenuation.

9 Claims, 3 Drawing Sheets

METHOD OF STABILIZING VALVE LIFT-OFF IN HYDRAULIC SHOCK ABSORBERS

BACKGROUND OF THE INVENTION

1. Technical Field

This invention relates to the technology of hydraulically absorbing or dissipating shook energy and, more particularly, to shock absorber assemblies that use spring biased valves to change the energy absorbing characteristics while quieting or eliminating mechanical noise.

2. Discussion of the Prior Art

As shown in FIG. 1, automotive shock absorbers typically have a piston rod 10 supported on a chassis or autobody component 11 and also have a cylinder 12 supported on a wheel 13 through a knuckle 14 so that hydraulic attenuation (fluid flow from a compression chamber to an expansion chamber) may be established by oil confined in the cylinder in response to sliding movement of the piston within the cylinder. The amount of energy absorbed or dissipated is determined by the velocity of the piston rod that is retarder by fluid flow between the chambers and the cylinder.

Often supplementary or secondary valves are deployed to vary the amount and sequence of fluid exchanged between such chambers to give real damping characteristics to the absorbing effect or ride quality for the automotive vehicle. These secondary valves are biased to a closed position by a relatively light spring to give a precise low energy lift-off response, but such spring biased valves may suffer from chatter or wobble as the fluid flow exiting from the valve orifice creates vortices in the expansion chamber thereby destabilizing movement of the valve.

Attempts to overcome such chatter or noise have been limited; one such attempt uses elastic elements in the valve guide (see U.S. Pat. No. 4,331,224) but this use destroys parameters chosen to provide a very specific ride quality; there is little latitude in varying the shock absorber parameters (such as spring stiffness, spring preload, valve mass) if such ride quality is to be achieved.

SUMMARY OF THE INVENTION

It is an object of the present invention to provide a method of stabilizing valve lift-off in a hydraulic shock absorber that does not interfere with the selection of shock absorber parameters and allows control of valve behavior independent of valve spring parameters.

The method of this invention, which meets the above object, is a method of stabilizing valve lift-off movement in an automotive hydraulic shock absorber having compression and expansion chambers filled with a hydraulic shock absorber fluid and divided by a valve body with one or more orifices that have fluid flow therethrough controlled by a spring biased valve that lifts off from the valve body when the fluid pressure differential between chambers is above a predetermined amount. The steps of the method comprise (a) stationing the spring biased valve with respect to the orifices so that the fluid forcing the valve to lift off and overcome the spring bias will exit from the orifices in a manner that creates a velocity gradient in the expansion chamber resulting in pressure differences that disturb a smooth lift-off of the valves; and (b) modifying the hydraulic shock absorber fluid to form a mixture containing fumed amorphous silica whereby the fluid mixture will possess a viscosity inversely proportional to the velocity of the fluid mixture so that, slow moving fluid mixture regions will stabilize the action of the valve while fast moving fluid mixture regions will achieve the needed hydraulic attenuation.

DETAILED DESCRIPTION AND BEST MODE

Figure 1:
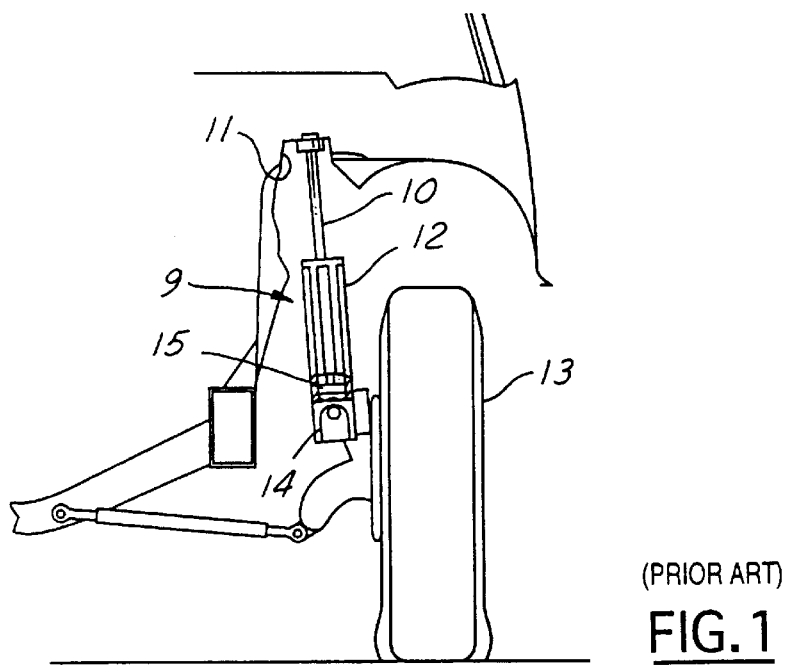
FIG. 1 is an elementary illustration of one application mode for the use of this invention showing an automotive shock absorber operating between an autobody component and a vehicle wheel.
Figure 2:
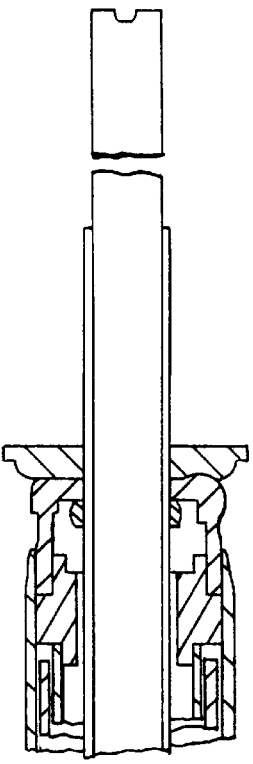
FIG. 2 is a central sectional elevational view of the interior elements of a conventional shock absorber showing the use of different valves for compression and rebound.
Figure 3:
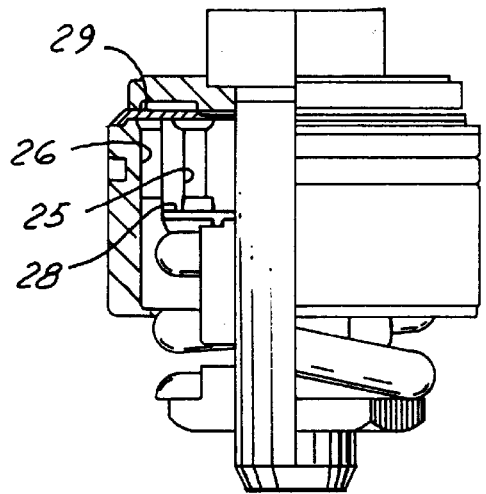
FIG. 3 is an enlarged view, partially shown in sections of the primary valve used in FIG. 2 to control compression and rebound.

As shown in FIGS. 1 and 2, a conventional automotive twin tube shock absorber operates by movement of a piston 15 downwardly toward a secondary (base cage) valve assembly 16 in the compression stroke causing hydraulic fluid to be displaced from chamber 17 into chamber 18 through orifice 26 of rebound check 29 of assembly 19 with a controlled amount from chamber 17 into reservoir chamber 20 through orifice 27 of compression damping valve 21. On the rebound stroke, displacement of fluid is through orifice 25 of piston rebound damping valve 28 of assembly 19, from chamber 18 into chamber 17, as well as through orifice 24 of compression check valve 23 of assembly 16 so that fluid is replenished from reservoir 20 into chamber 17.

On the rebound stroke, that is, on the upward movement of the piston 15, hydraulic fluid will be displaced from chamber 18 back into chamber 17, but the volume of fluid displaced through the piston's rebound damping valve 28 will be insufficient to fill the total volume of chamber 17 above the valve assembly 16. Therefore, make-up hydraulic fluid will be received from the reservoir chamber 20 through orifice passage 24 in the secondary valve assembly 16; the pressure of the hydraulic fluid in orifice passage 24 opens a plate type valve 23 against substantially little resistance and allows relatively free flow of the hydraulic fluid from the reservoir chamber 20 into the chamber 17. The constant pulsing (due to irregularities in the road) of the displaced fluid into and out of the reservoir chamber, however, creates high turbulence of the hydraulic fluid in the reservoir chamber and in chamber 17 resulting in absorption of gas into the hydraulic fluid, thereby churning such fluid. Such high pulsing from compression to rebound destabilizes the movement of the valve 23 which is weakly biased by a spring to obtain a desired lift off. The spring and valve structure are engineered (spring stiffness and/or preload) to provide a very specific ride quality. But due to turbulence or eddy currents of the fluid flowing past the secondary valve 23, the lift-off of the valve is not smooth but rather experiences chatter or wobble creating irritating noises that may become intolerable to the user of the vehicle. Because of the need to retain a very specific ride quality, there is little latitude in changing the spring stiffness and/or preload to eliminate such chatter or destabilization.

Figure 5:
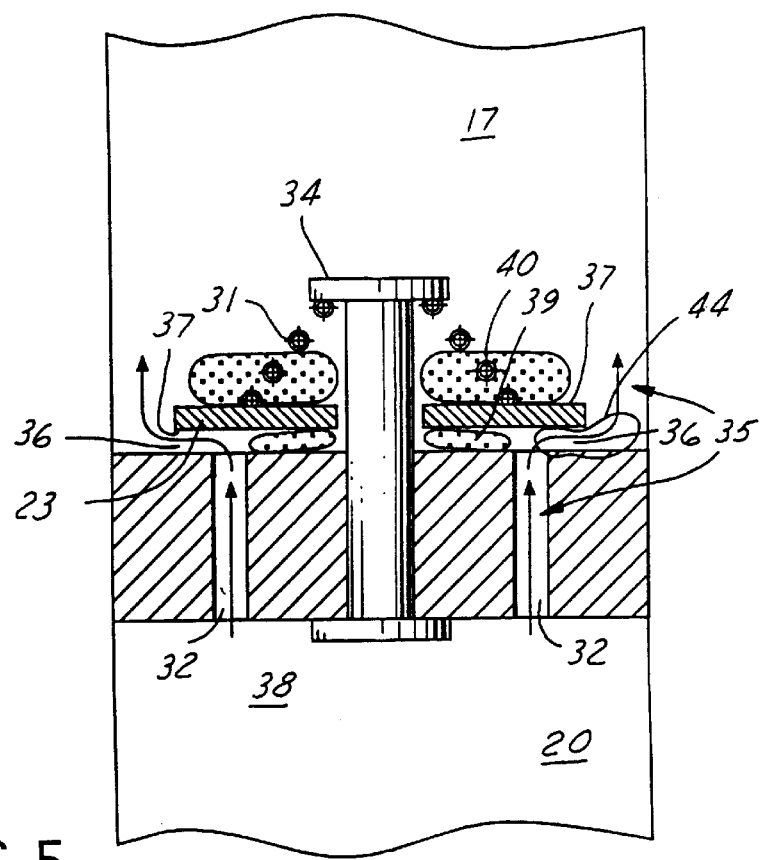
FIG. 5 is a still further enlarged schematic sectional view of a portion of FIG. 4, illustrating still another spring biased secondary valve showing how the fluid mixture operates with this invention.
Figure 4:
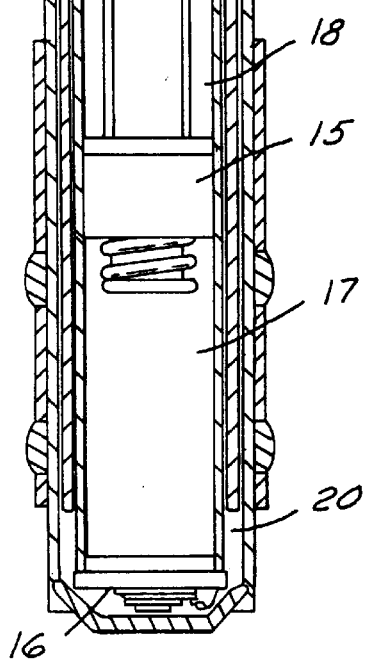
FIG. 4 is an enlarged sectional view of one type of secondary (base cage) valve that controls refilling of fluid from the reservoir chamber and operating in accordance with this invention.
Figure 4:
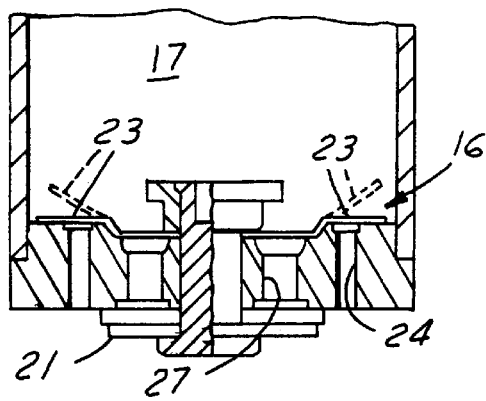

Please note in FIG. 4 that the orifices of the valve are located so that fluid, forcing the valve 23 to lift off and overcome the spring bias, will exit from the orifices creating a velocity gradient in chamber 17 with an accompanying pressure gradient that disturbs a smooth lift-off of the valve. This is particularly inherent when valve 23 is flat-faced, as shown in FIG. 5, and valve 23 is moved in an up or down linear direction from a valve body 33 by a conically shaped spring 31 acting on the outer periphery of such flat-face to close a plurality of orifices 32 located just inside the outer periphery of the flat-face. The spring 31 acts between the flanged end of a pin 34 that is carried centrally in the valve body 33. The velocity gradient is created by flow 35 that must speed up to flow through a restricted space 36 between the outer lip 37 of the valve and the valve body 33. The stiffness of the spring for biasing the valve is in the range of 200 newtons/meter, while the valve mass is about one gram.

In accordance with this invention, the reservoir, expansion and compression chambers of the shock absorber are filled with a hydraulic shock absorber fluid mixture 38 containing a thixotropic additive, fumed amorphous silica, so that the mixture will possess a viscosity inversely proportional to the velocity of the fluid mixture as it flows through the valve structure whereby slow moving fluid mixture regions 39, 40 will stabilize the needed action of the valve 23 while fast moving mixture regions 41 will achieve hydraulic attenuation with less viscosity. If the valve 23 is in its bottommost position closing off the orifices 32, the pressure of the oil mixture forces valve 23 upwardly allowing the mixture to flow through the orifices 32 from chamber 20 back into chamber 17 as a result of a rebound stroke. Oil flows at a higher velocity through gap 36 around the valve 23 as indicated by the high velocity region 41. Lower velocity regions 39 and 40 are located in the boundary layer around the valve inwardly of the periphery of valve 23. Because the shock absorber fluid mixture viscosity is now dependent on flow velocity of the oil mixture, due to the physical presence of the thixotropic additive, fumed silica, the valve will be cushioned by a more viscous medium in regions 39, 40 that will ensure little or no wobble lift-off. The presence of the fumed silica imports a thixotropic characteristic to the mixture and modifies the viscosity of the mixture. Viscosity is a ratio of the shear force (imagined as thin layers of liquid sliding over each other) to the rate of displacement (velocity gradient). The interdependency of the shear force to the velocity gradient, when measured over wide ranges of values, represent viscosity. In conventional mineral oil or other fluid systems, the viscosity remains approximately constant as the velocity gradient is increased. The viscosity of the fluid mixture at high shear rates is about 30 centipoise and the viscosity rises up to about 1000 centipoise as the shear rate is reduced.

Figure 6:
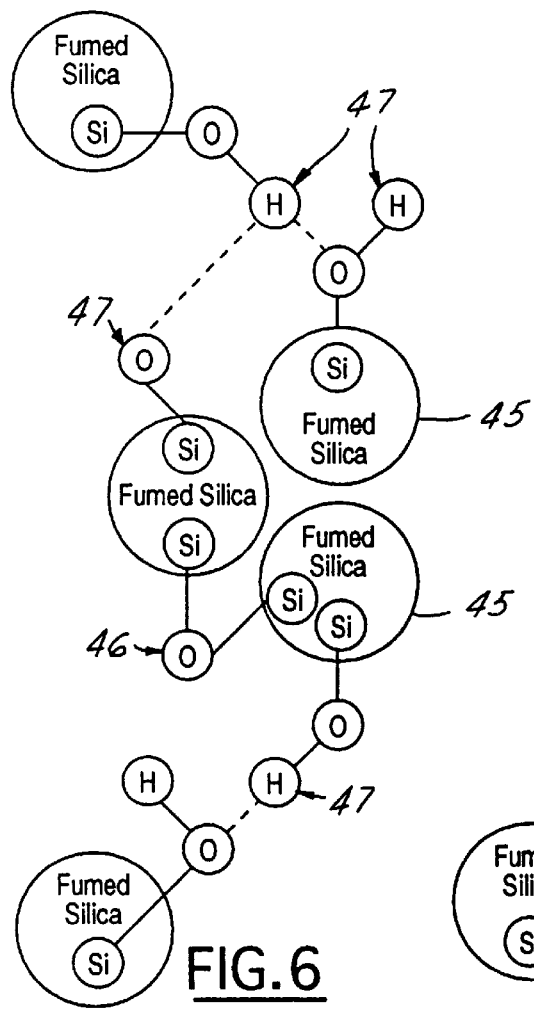
FIG. 6 is a molecular representation of the structure of hydrophobic fumed silica in the wetted condition, used as an additive in the oil mixture of this invention.
Figure 7:
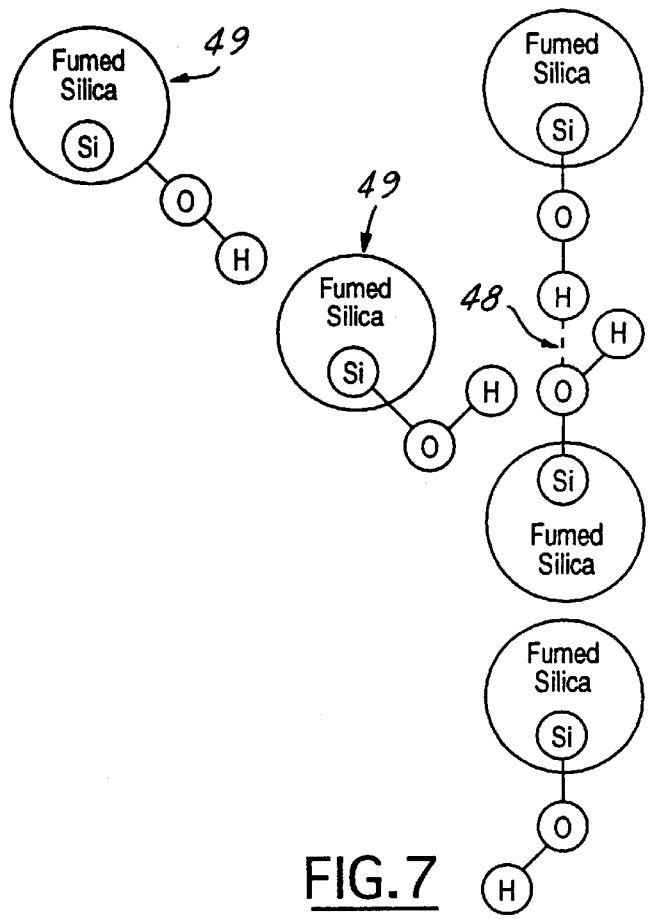
FIG. 7 is a molecular representation of the structure of the fumed silica after it has been disturbed by high velocity of the oil in which it is mixed.

Amorphous hydrophobic fumed silica was mixed with the shock absorber fluid, preferably mineral oil, in an amount of 0.5–4.0% by wt. of the mineral oil. The fumed silica was of a hydrophobic type (not wettable by water) and may contain polar additives amounting to less than 2% by wt. of the fumed silica, such as carbon or traces of HCl or $Fe_2O_3$ with the remainder being $SiO_2$. The primary particles of the fumed hydrophobic silica had a diameter ranging from 5–30 nanometers. Like quartz, they are composed of $SiO_4$ tetrahedra 45 (see FIG. 6). They are not crystalline but rather are random amorphous structures. The $SiO_4$ tetrahedra 45 are interconnected by way of siloxane linkages (Si—O—Si) 46. Silanol groups (Si—O—H) 47 are of paramount importance because they form hydrogen bonds to themselves on other substances, particularly when added to a liquid. The silanol groups aggregate to form hydrogen bonds to each other. And a three-dimensional network of particles develops that restricts the mobility of the particles of the fluid (see FIG. 6). When the mineral oil mixture containing the fumed silica is disturbed by flowing through a restricted passage to increase its velocity, the process of hydrogen linkage is reversed as shown in FIG. 7. Some of the hydrogen bonds, which confer stability, are ruptured (at 48). The 3-D network collapses and the particles 49 of silica liquid become more mobile and the viscosity of the substance decreases. The greater the applied force, or the shear rate applied to the fluid, the more linkages are broken and the less viscous the substance becomes (as shown in FIG. 7). Thus, the mixture will have a viscosity inversely proportional to the velocity of the mixture so that slow moving mixture regions will stabilize the actions of valve 23 while fast moving regions will achieve needed hydraulic attenuation (compression or rebound).

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of stabilizing the valve lift-off movement in an automotive hydraulic shock absorber having first and second fluid containing chambers divided by valve body having one or more orifices communicating the chambers and with a valve resiliently biased to contact the valve body to close said orifices when the fluid differential between such chambers is below a predetermined amount, comprising:

(a) stationing said valve with respect to said orifices so that the fluid, forcing the valve to overcome said bias, will exit from the orifices in a manner creating a velocity gradient in the expansion chamber resulting in pressure differences that disturb a smooth lift-off of said valve; and (b) modifying the fluid in said chambers to become a mixture containing a thixotropic additive whereby the said mixture will possess a viscosity inversely proportional to the velocity of said mixture so that slow moving fluid mixture regions will stabilize the action of the valve while fast moving mixture regions will achieve needed hydraulic attenuation.

2. The method as in claim 1 in which said thixotropic additive is fumed amorphous silica.

3. The method as in claim 2, in which fumed silica is present in said mixture in an amount of 0.5–4.0% by wt. of the mixture.

4. The method as in claim 1, in which said shock absorber fluid is mineral oil.

5. The method as in claim 2, in which said silica is hydrophobic.

6. The method as in claim 2, in which said fumed silica contains less than 2% polar additives, with the remaining being $SiO_2$.

7. The method as in claim 1, in which the viscosity of said fluid mixture at high shear rates is about 30 centipoise and the viscosity rises up to about 1000 centipoise as the shear rate is reduced.

8. The method as in claim 1, in which the stiffness of said spring for biasing said valve is in the range of 200 newtons/meter, while the valve mass is about one gram.

9. The method as in claim 2, in which said fumed silica is added to said mineral oil as a powder with a particle size in the range of 5–30 nanometers.

* * * * *